(12) United States Patent
Kim et al.

(10) Patent No.: US 11,875,943 B2
(45) Date of Patent: Jan. 16, 2024

(54) MULTILAYER CERAMIC CAPACITOR

(71) Applicant: SAMSUNG ELECTRO-MECHANICS CO., LTD., Suwon-si (KR)

(72) Inventors: Je Jung Kim, Suwon-si (KR); Ji Won Lee, Suwon-si (KR); Ye Jin Jeong, Suwon-si (KR); Jae Joon Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 38 days.

(21) Appl. No.: 17/693,813

(22) Filed: Mar. 14, 2022

(65) Prior Publication Data
US 2023/0170143 A1 Jun. 1, 2023

(30) Foreign Application Priority Data
Nov. 26, 2021 (KR) .................. 10-2021-0165493

(51) Int. Cl.
H01G 4/12 (2006.01)
H01G 4/232 (2006.01)
(Continued)

(52) U.S. Cl.
CPC .............. *H01G 4/12* (2013.01); *H01G 4/232* (2013.01); *H01G 4/248* (2013.01); *H01G 4/30* (2013.01)

(58) Field of Classification Search
CPC ............ H01G 4/30; H01G 4/12; H01G 4/248; H01G 4/232
(Continued)

(56) References Cited

U.S. PATENT DOCUMENTS

2011/0235233 A1  9/2011  Ando et al.
2013/0301185 A1  11/2013  Lee et al.
(Continued)

FOREIGN PATENT DOCUMENTS

JP  2002-299145 A  10/2002
JP  2003-264120 A  9/2003
(Continued)

OTHER PUBLICATIONS

Japanese Office Action dated Mar. 22, 2023, issued in corresponding Japanese Patent Application No. 2022-051431 (with English Translation).

*Primary Examiner* — Arun Ramaswamy
(74) *Attorney, Agent, or Firm* — Morgan, Lewis & Bockius LLP

(57) ABSTRACT

A multilayer ceramic capacitor includes a body including a dielectric layer and first and second internal electrodes alternately disposed with the dielectric layer interposed therebetween, a first external electrode disposed on the body and connected to the first internal electrode, and a second external electrode disposed on the body and connected to the second internal electrode. The dielectric layer includes a first dielectric layer adjacent to the first internal electrode, a second dielectric layer adjacent to the second internal electrode, and a third dielectric layer disposed between the first and second dielectric layers. D1<D3 and D2<D3, in which D1 is an average particle size of dielectric grains included in the first dielectric layer, D2 is an average particle size of dielectric grains included in the second dielectric layer, and D3 is an average particle size of dielectric grains included in the third dielectric layer.

20 Claims, 8 Drawing Sheets

(51) Int. Cl.
*H01G 4/248* (2006.01)
*H01G 4/30* (2006.01)

(58) Field of Classification Search
USPC .................. 361/301.4, 312, 321.1, 321.5
See application file for complete search history.

(56) References Cited

U.S. PATENT DOCUMENTS

| | | | |
|---|---|---|---|
| 2013/0321978 A1* | 12/2013 | Lee .................. | H01G 4/1227 |
| | | | 361/301.4 |
| 2014/0071586 A1 | 3/2014 | Park et al. | |
| 2016/0314900 A1* | 10/2016 | Sin ................... | H01G 4/12 |
| 2017/0025222 A1* | 1/2017 | Park .................. | H01G 4/1209 |
| 2019/0131075 A1 | 5/2019 | Park et al. | |
| 2021/0057156 A1 | 2/2021 | Seo et al. | |

FOREIGN PATENT DOCUMENTS

| | | |
|---|---|---|
| JP | 2011-210874 A | 10/2011 |
| JP | 2012-049449 A | 3/2012 |
| JP | 2014-053584 A | 3/2014 |
| JP | 2021-031380 A | 3/2021 |
| JP | 2021-061289 A | 4/2021 |
| KR | 10-2013-0125106 A | 11/2013 |
| KR | 10-2019-0047377 A | 5/2019 |

* cited by examiner

MULTILAYER CERAMIC CAPACITOR

CROSS-REFERENCE TO RELATED APPLICATION(S)

This application claims the benefit under 35 USC 119(a) of Korean Patent Application No. 10-2021-0165493 filed on Nov. 26, 2021 in the Korean Intellectual Property Office, the entire disclosure of which is incorporated herein by reference for all purposes.

TECHNICAL FIELD

The present disclosure relates to a multilayer ceramic capacitor.

BACKGROUND

A multilayer ceramic capacitor (MLCC), a multilayer electronic component, is a chip-type condenser mounted on the printed circuit boards of various types of electronic products such as display devices including liquid crystal displays (LCDs) and plasma display panels (PDPs), computers, smartphones, cell phones, and the like to allow electricity to be charged therein and discharged therefrom.

Such an MLCC having advantages such as compactness, guaranteed high capacitance, and ease in mounting thereof may be used as a component of various electronic devices. Recently, as various electronic devices have become smaller and have been implemented with higher performance, the importance of ensuring high reliability in multilayer ceramic capacitors has accordingly increased.

Recently, in multilayer ceramic capacitors, dielectric layers or internal electrode layers have been thinned in order to achieve miniaturization and high capacitance.

As such, when the thickness of the dielectric layers of multilayer ceramic capacitors is reduced, electrical performance such as capacitance may be improved, but the frequency of electrostrictive destruction due to electrostriction may increase and high-temperature reliability may be weakened.

In addition, in order to alleviate a phenomenon of reduced reliability in the case of forming a thin dielectric layer, a method of reducing a particle size of a dielectric layer to make it finer has been considered, but a problem may arise in that a desired capacitance may not be able to be obtained due to a low dielectric constant.

SUMMARY

Exemplary embodiments reduce a phenomenon of electrostrictive destruction caused by an electrostriction phenomenon when a dielectric layer is formed to be thin in order to improve electrical performance, such as capacitance, and address a problem of reduction of high-temperature reliability.

Exemplary embodiments address a problem in which a dielectric constant is lowered when a particle size of a dielectric layer is reduced to improve reliability of a multilayer ceramic capacitor.

According to an exemplary embodiment, a multilayer ceramic capacitor includes: a body including a dielectric layer and first and second internal electrodes alternately disposed with the dielectric layer interposed therebetween, a first external electrode disposed on the body and connected to the first internal electrode, and a second external electrode disposed on the body and connected to the second internal electrode. The dielectric layer includes a first dielectric layer adjacent to the first internal electrode, a second dielectric layer adjacent to the second internal electrode, and a third dielectric layer disposed between the first dielectric layer and the second dielectric layer. $D1<D3$ and $D2<D3$, in which D1 is an average particle size of dielectric grains included in the first dielectric layer, D2 is an average particle size of dielectric grains included in the second dielectric layer, and D3 is an average particle size of dielectric grains included in the third dielectric layer.

According to an exemplary embodiment, a multilayer ceramic capacitor includes: a body including a dielectric layer and internal electrodes alternately disposed with the dielectric layer interposed therebetween and external electrodes disposed on the body and connected to the internal electrodes. The dielectric layer includes a fourth dielectric layer and a fifth dielectric layer including dielectric grains having an average particle size greater than an average particle size of dielectric grains included in the fourth dielectric layer. $t4<t5$, in which t4 is an average thickness of the fourth dielectric layer and t5 is an average thickness of the fifth dielectric layer.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
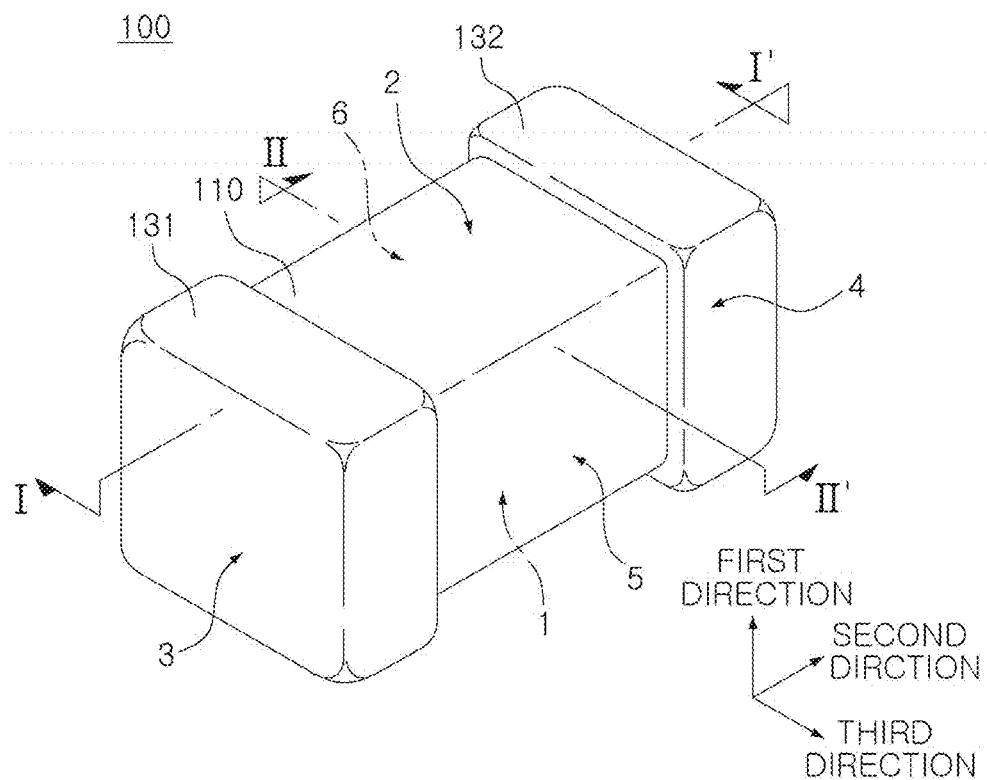
FIG. 1 is a schematic perspective view of a multilayer ceramic capacitor according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising," will be understood to imply the inclusion of stated elements but not the exclusion of any other elements.

In the drawings, a first direction may be defined as a stacking direction or a thickness (T) direction, a second direction may be defined as a length (L) direction, and a third direction may be defined as a width (W) direction.

Multilayer Ceramic Capacitor

Hereinafter, a multilayer ceramic capacitor according to an exemplary embodiment in the present disclosure will be described in detail with reference to FIGS. 1 to 8.

A multilayer ceramic capacitor includes: a body including a dielectric layer and first and second internal electrodes alternately disposed with the dielectric layer interposed therebetween, a first external electrode disposed on the body and connected to the first internal electrode, and a second external electrode connected to the second internal electrode, the dielectric layer includes a first dielectric layer adjacent to the first internal electrode, a second dielectric layer adjacent to the second internal electrode, and a third dielectric layer disposed between the first dielectric layer and the second dielectric layer, and D1<D3 and D2<D3 in which D1 is an average particle size of dielectric grains included in the first dielectric layer, D2 is an average particle size of dielectric grains included in the second dielectric layer, and D3 is an average particle size of dielectric grains included in the third dielectric layer.

Referring to FIG. 1, in a body 110, a dielectric layer 111 and first and second internal electrodes 121 and 122 are alternately stacked.

There is no particular limitation to a specific shape of the body 110 but, as illustrated, the body 110 may have a hexahedral shape or a shape similar thereto. Due to contraction (or shrinkage) of ceramic powder particles included in the body 110 during a sintering process, the body 110 may have substantially a hexahedral shape, rather than a hexahedral shape with perfectly straight lines, though.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and an example of the ceramic powder particles may include $BaTiO_3$ and $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ obtained by partially dissolving calcium (Ca), zirconium (Zr), and the like in $BaTiO_3$.

As a material for forming the dielectric layer 111, various ceramic additives, organic solvents, binders, dispersants, etc. may be added to the powder such as barium titanate ($BaTiO_3$) according to purposes of the present disclosure.

The body 110 may include a capacitance forming portion A formed inside the body 110 and forming capacitance by the first internal electrode 121 and the second internal electrode 122 disposed to face each other with the dielectric layer 111 interposed therebetween and cover portions 112 and 113 formed above and below the capacitance forming portion A.

In addition, the capacitance forming portion A is a portion that contributes to formation of capacitance of the capacitor, which may be formed by repeatedly stacking a plurality of first and second internal electrodes 121 and 122 with the dielectric layer 111 interposed therebetween.

The upper cover portion 112 and the lower cover portion 113 may be formed by stacking a single dielectric layer or two or more dielectric layers on upper and lower surfaces of the capacitance forming portion A in the thickness direction, respectively, and may basically serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, barium titanate ($BaTiO_3$)-based ceramic material.

In addition, margin portions 114 and 115 may be disposed on side surfaces of the capacitance forming portion A.

The margin portions 114 and 115 may include a margin portion 114 disposed on the sixth surface 6 of the body 110 and a margin portion 115 disposed on the fifth surface 5 of the body 110. That is, the margin portions 114 and 115 may be disposed on both side surfaces of the ceramic body 110 in the width direction.

Figure 3:
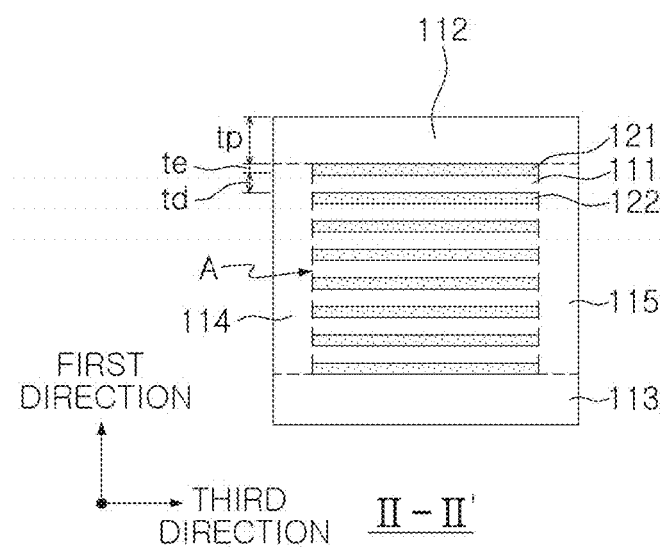
FIG. 3 a schematic cross-sectional view taken along line II-II' of FIG. 1.

As shown in FIG. 3, the margin portions 114 and 115 may refer to regions between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding regions in the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance forming portion A in the width direction.

The internal electrodes 121 and 122 may be alternately disposed with the dielectric layer 111.

The internal electrodes 121 and 122 may include first and second internal electrodes 121 and 122. The first and second internal electrodes 121 and 122 may be alternately disposed to face each other with the dielectric layer 111 configuring the body 110 interposed therebetween and may be in contact with the first and second external electrodes on the third and fourth surfaces 3 and 4 of the body 100, respectively.

Figure 2:
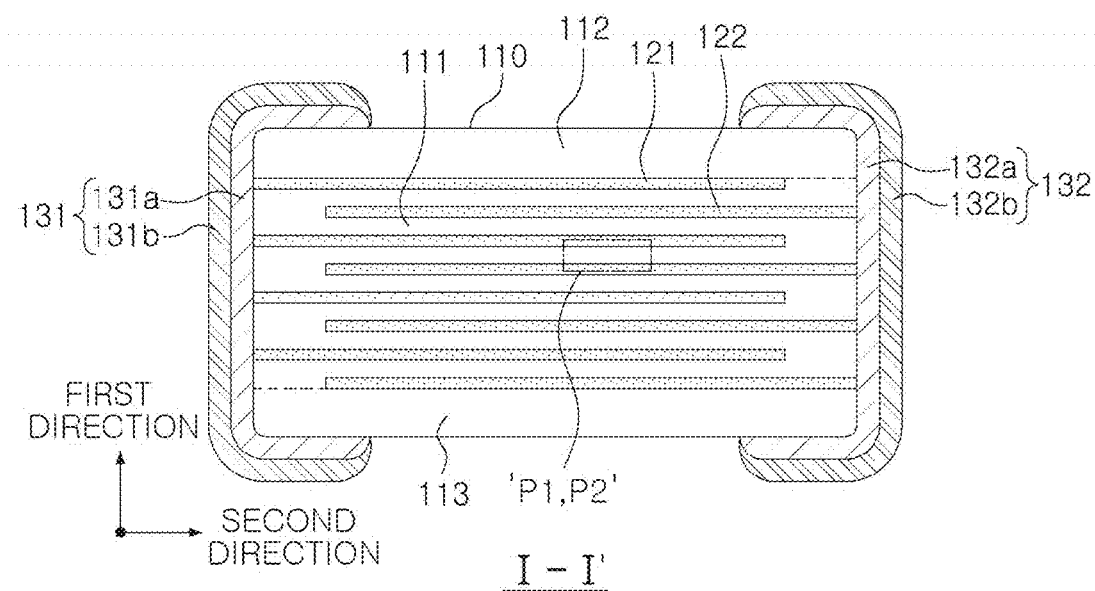
FIG. 2 is a schematic cross-sectional view taken along line I-I' of FIG. 1.

Referring to FIG. 2, the first internal electrode 121 may be spaced apart from the fourth surface 4 and may be in contact with the first external electrode 131 on the third surface 3, and the second external electrode 122 may be spaced apart from the third surface 3 and may be in contact with the second external electrode 132 on the fourth surface 4.

In this case, the first and second internal electrodes 121 and 122 may be electrically separated from each other by the dielectric layer 111 disposed therebetween.

Figure 4:
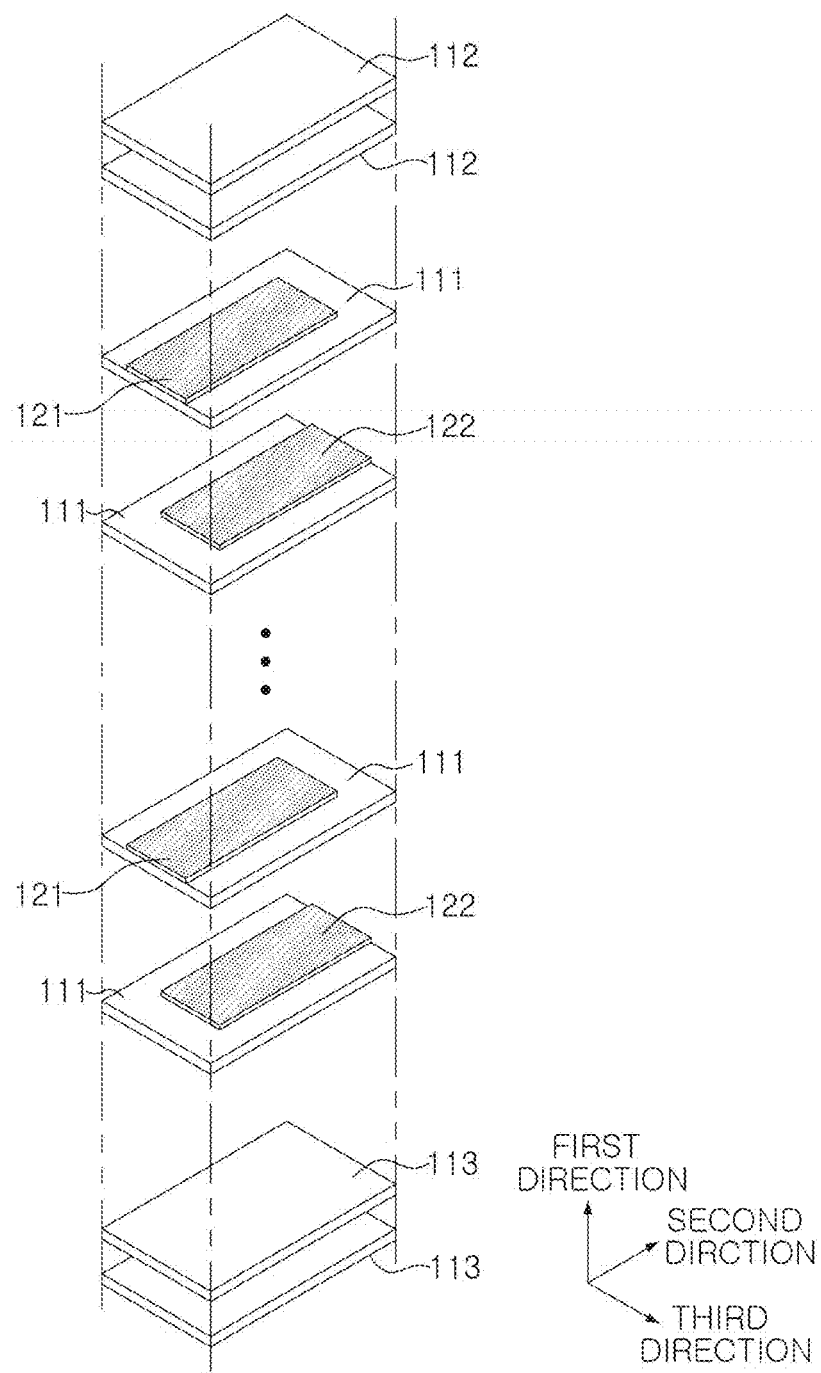
FIG. 4 is an exploded perspective view schematically illustrating a body in which dielectric layers and internal electrodes are stacked according to an exemplary embodiment or another exemplary embodiment in the present disclosure.

Referring to FIG. 4, the body 110 may be formed by alternately stacking a ceramic green sheet on which the first internal electrode 121 is printed and a ceramic green sheet on which the second internal electrode 122 is printed and subsequently sintering the green sheets.

The conductive metals included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

In addition, the internal electrodes 121 and 122 may form internal electrodes by printing a conductive paste on a ceramic green sheet, and a screen-printing method or a gravure printing method may be used as a printing method of the conductive paste for the internal electrodes.

Meanwhile, the external electrodes 131 and 132 may be formed using any material as long as the corresponding material has electrical conductivity, such as metal, and specific materials may be determined in consideration of electrical characteristics and structural stability, and furthermore, may have a multilayer structure.

For example, the external electrodes 131 and 132 may include electrode layers 131a and 132a disposed on the body 110 and plating layers 131b and 132b formed on the electrode layers 131a and 132a.

As a more specific example of the electrode layers 131a and 132a, the electrode layers 131a and 132a may be sintered electrodes including conductive metal and glass, or resin-based electrodes including conductive metal and resin.

In addition, the electrode layers 131a and 132a may have a form in which a sintered electrode and a resin-based electrode are sequentially formed on the body 110. In addition, the electrode layers 131a and 132a may be formed by transferring a sheet including a conductive metal onto the body or by transferring a sheet including a conductive metal onto the sintered electrode.

As the conductive metal included in the electrode layers 131a and 132a, a material having excellent electrical conductivity may be used, but the material is not particularly limited. For example, the conductive metal may be one or more of nickel (Ni), copper (Cu), and alloys thereof.

The plating layers 131b and 132b serve to improve mounting characteristics. The type of the plating layers 131b and 132b is not particularly limited, and may be a plating layer including at least one of Ni, Sn, Pd, and alloys thereof, and may be formed of a plurality of layers.

As a more specific example of the plating layers 131b and 132b, the plating layers 131b and 132b may be a Ni plating layer or a Sn plating layer, may have a form in which an Ni plating layer and an Sn plating layer are sequentially formed on the electrode layers 131a and 132a or may have a form in which an Sn plating layer, an Ni plating layer, and an Sn plating layer are sequentially formed on the electrode layers 131a and 132a. Also, the plating layers 131b and 132b may include a plurality of Ni plating layers and/or a plurality of Sn plating layers.

A size of the multilayer electronic component 100 does not need to be particularly limited.

However, in order to achieve both miniaturization and high capacitance, the number of stacks should be increased by reducing the thickness of the dielectric layer and the internal electrodes, and thus, the effect of improving reliability and insulation resistance may be more remarkable in a multilayer electronic component having a 0402 (length×width, 0.4 mm×0.2 mm).

Accordingly, when a distance between the third and fourth surfaces of the body is defined as L and a distance between the fifth and sixth surfaces as W, L may be 0.4 mm or less and W may be 0.2 mm or less. That is, it may be a multilayer electronic component having 0402 size (length×width, 0.4 mm×0.2 mm) or less.

In the case of multilayer ceramic capacitors, ferroelectric materials such as PZT and $BaTiO_3$ are often used as dielectric materials to obtain high energy density and electric capacitance. These materials undergo mechanical deformation in response to an external electric field, and this phenomenon is called flexoelectricity.

In the case of a conventional multilayer ceramic capacitor in which a dielectric layer is thinly formed for miniaturization and high capacitance, a dielectric layer disposed between internal electrodes of the capacitor is sintered using powder particles having the same size.

Accordingly, a particle size of the dielectric grains of the dielectric layer after sintering may also exist within a certain distribution.

When an alternating electric field is applied from the outside, the ferroelectric particles forming the dielectric layer continuously vibrate due to the flexoelectricity. As a result, if there is no significant difference in particle size of the dielectric grains forming the dielectric layer, vibration generated due to flexoelectricity cannot be canceled out (or offset).

As a result, a continuous stress may be applied to the multilayer ceramic capacitor to form electrostriction cracks inside the multilayer ceramic capacitor, and such cracks may lead to deterioration of reliability at high temperature.

A multilayer ceramic capacitor according to the exemplary embodiment in the present disclosure may include the body 110 including a dielectric layer 111 and first and second internal electrodes 121 and 122 alternately disposed with the dielectric layer 111 interposed therebetween, a first external electrode 131 disposed on the body 110 and connected to the first internal electrode 121, and a second external electrode 132 connected to the second internal electrode 122. The dielectric layer 111 may include a first dielectric layer 111a adjacent to the first internal electrode 121, a second dielectric layer 111b adjacent to the second internal electrode 122, and a third dielectric layer 111c disposed between the first dielectric layer 111a and the second dielectric layer 111b. D1<D3 and D2<D3 in which D1 is an average particle size of dielectric grains included in the first dielectric layer 111a, D2 is an average particle size of dielectric grains included in the second dielectric layer 111b, and D3 is an average particle size of dielectric grains included in the third dielectric layer 111c.

Figure 7:
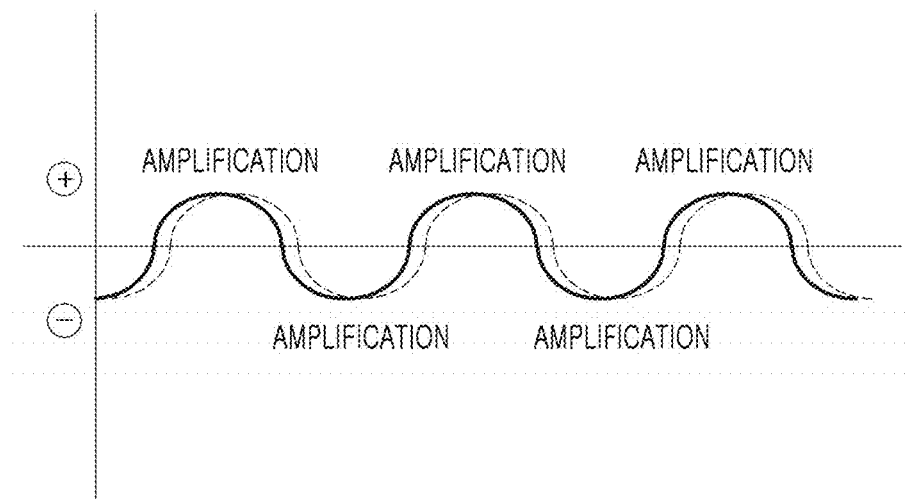
FIG. 7 is a graph illustrating a state in which an electrostriction phenomenon occurs when there is no substantial difference in an average particle size of dielectric grains.
Figure 8:
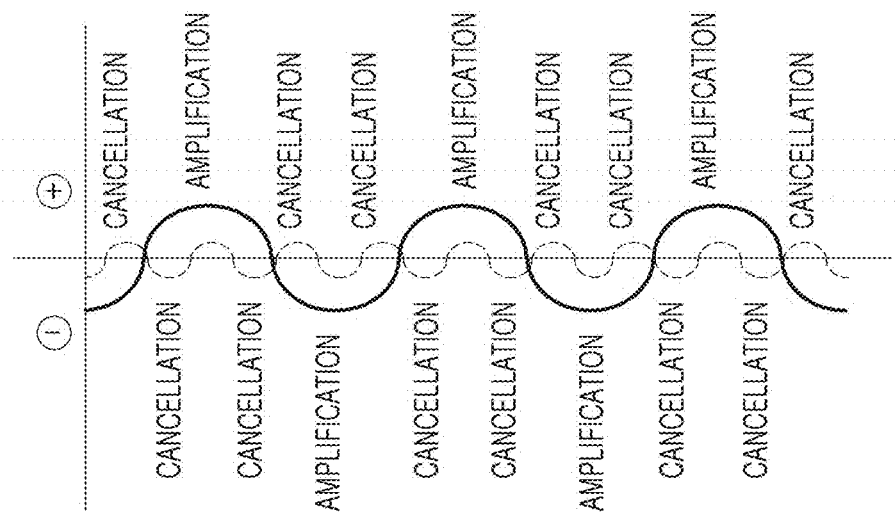
FIG. 8 is a graph illustrating a state in which an electrostriction phenomenon occurs when there is a substantial difference in an average particle size of dielectric grains.

FIG. 7 shows an example in which an electrostriction phenomenon occurs when there is no substantial difference in an average particle size of dielectric grains included in each region of the dielectric layer, and FIG. 8 is a graph illustrating a case in which there is a substantial difference in the average particle sizes of dielectric grains included in each region of the dielectric layer.

Referring to FIGS. 7 and 8, in the case of FIG. 7, there is no substantial difference in the particle size of dielectric grains, so it is difficult to cancel out the electrostriction effect. Meanwhile, in the case of FIG. 8, since there is a substantial difference in the particle sizes of dielectric grains constituting each region of the dielectric layer, the pattern in which the electrostriction phenomenon occurs in each region may be different. Specifically, in a region in which an average particle size is large, the frequency of vibration due to electrostriction is large and the amplitude is small. Meanwhile, in a region in which the average particle size is small, the frequency of vibration due to electrostriction is small and the amplitude is large. Therefore, when there is a sufficient difference in the average particle size of dielectric grains included in each region constituting the dielectric layer, an effect of canceling out vibration due to the electrostriction effect may occur.

In order to obtain the effect of canceling out vibration due to the electrostriction, a difference in the average particle size of dielectric grains constituting each region is preferably 50 nm or more, but is not limited thereto.

Accordingly, in the multilayer ceramic capacitor according to the exemplary embodiment in the present disclosure, since the dielectric layer is formed of a plurality of layers, and the average particle sizes of the dielectric grains constituting each layer are different from each other, an effect of canceling the electrostriction may be induced.

In addition, by forming the first dielectric layer and the second dielectric layer having small dielectric particle sizes in a portion of the dielectric layer, BDV and DC-BIAS characteristics may be improved, and by forming the third dielectric layer having a relatively large dielectric particle size between the first dielectric layer and the second dielectric layer, capacitance may be secured.

Figure 5:
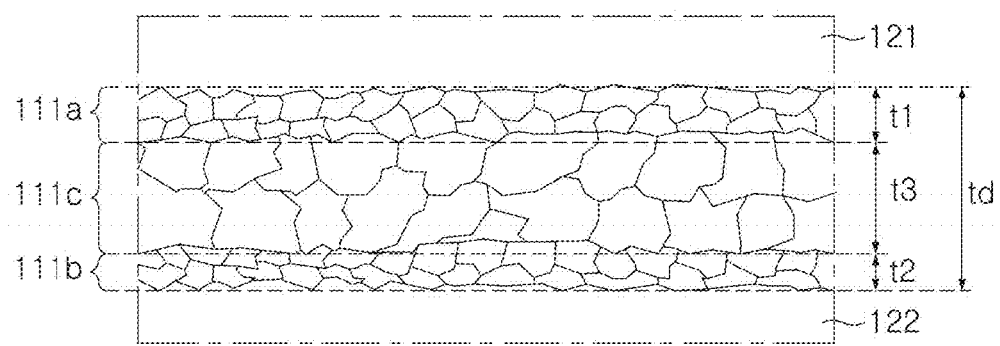
FIG. 5 is an enlarged view illustrating region P1 of FIG. 2 according to an exemplary embodiment in the present disclosure.

Referring to FIG. 5, the first dielectric layer 111a, the second dielectric layer 111b, and the third dielectric layer 111c may be a unit for dividing the dielectric layer 111 including dielectric grains having different average particle sizes.

The particle sizes of the dielectric grains constituting each region may be substantially the same in each region according to a manufacturing method thereof, and may be adjusted to have a particle size within a certain distribution.

In addition, the average particle size D1 of the dielectric grains included in the first dielectric layer 111a, the average particle size D2 of the dielectric grains included in the second dielectric layer 111b, and the average particle sizes D3 of the dielectric grains included in the third dielectric layer 111c may be different from each other or may be substantially the same.

When D1, D2, and D3 are different from each other, respective regions may be easily distinguished from each other by observing the dielectric layer using a scanning electron microscope (SEM).

Here, a difference in the average particle size of the dielectric grains included in each region is preferably 50 nm or greater.

Here, the first dielectric layer 111a may refer to a region from a lower surface of the first internal electrode 121 to an upper surface of the third dielectric layer 111c, and the second dielectric layer 111b may refer to a region from an upper surface of the second internal electrode 122 to a lower surface of the third dielectric layer 111c.

The margin portion, the cover portion, and the dielectric layer of the multilayer ceramic capacitor may include dielectric grains, and the "average particle size" of the dielectric grains may refer to an average value obtained by calculating using an image analysis program (LAS X Grain Expert by Leica Microsystems) after imaging 10 points at equal intervals in a length direction in a length/thickness directional-thickness directional cross-section passing through the center of the multilayer ceramic capacitor. Other measurement methods and/or tools appreciated by one of ordinary skill in the art, even if not described in the present disclosure, may also be used.

According to an exemplary embodiment, the ratio of D3 to D1 (D3/D1) may satisfy 1.3 to 2.3, and the ratio of D3 to D2 (D3/D2) may satisfy 1.3 to 2.3.

If D3/D1 and D2/D1 are less than 1.3, a difference in particle size of dielectric grains of each region may be too small and it may be difficult to induce the effect of canceling out the electrostriction.

If D3/D1 and D2/D1 exceed 2.3, the difference in particle size of dielectric grains for each region may increase, which may lead to deterioration of high-temperature reliability.

By adjusting D3/D1 and D2/D1 to be within the above range, an electrostriction phenomenon may be further canceled and deterioration of high-temperature reliability may be prevented.

According to an exemplary embodiment, when an average thickness of the first dielectric layer 111a is t1, an average thickness of the second dielectric layer 111b is t2, and an average thickness of the third dielectric layer 111c is t3, t1<t3 may be satisfied and t2<t3 may be satisfied.

The first internal electrode and the second dielectric layers 111a and 111b are formed of dielectric grains having an average particle size smaller than that of the third dielectric layer 111c, thus serving to improve reliability such as improvement of DC-bias and TCC characteristics and improvement of short-circuit.

Meanwhile, since the third dielectric layer 111c are formed of dielectric grains having a larger average particle size than the first dielectric layer and the second dielectric layer 111a and 111b, it may serve to secure a high-capacitance multilayer ceramic capacitor.

Since the first dielectric layer and the second dielectric layer 111a and 111b may contribute to an improvement of reliability and are disposed with the third region interposed therebetween, the effect of increasing reliability may be obtained even though thicknesses t1 and t2 are ⅓ to ¹⁄₁₀ of the thickness t3 of the third dielectric layer 111c.

Accordingly, by organically controlling the respective thicknesses t1, t2, and t3 of the regions 111a, 111b and 111c of the dielectric layer 111, high capacitance may be secured, while the reliability of the multilayer ceramic capacitor is improved.

An average thickness of the dielectric layer 111 and the first to third dielectric layers 111a, 111b, and 111c may be measured by scanning an image of a cross-section in the length and thickness directions (L-T) by a scanning electron microscope (SEM) of 10,000 magnification. More specifically, the average thickness may be an average value of thicknesses measured by dividing, as the first to third dielectric layers 111a, 111b, and 111c, sections in which an average particle size of the dielectric grains of the dielectric layer 111 changes by 1.3 times to 2.3 times in the thickness direction at 10 points of the capacitance forming portion A at equal intervals in the length direction in the scanned image.

When the average thickness of the dielectric layer 111 is a thin film of 0.41 μm or less, more cracks may occur due to vibrations due to electrostriction and it may be difficult to secure high capacitance.

However, even when the average thickness of the dielectric layer 111 is 0.41 μm or less, D1<D3 and D2<D3 are satisfied, thereby canceling out the electrostriction phenomenon to suppress the occurrence of electrostriction cracks and securing sufficient capacitance.

Here, the average thickness of the dielectric layer 111 of 0.41 μm or less may not mean that the average thickness of the dielectric layer 111 should be 0.41 μm or less but may mean that the dielectric layer 111 is thinner than the dielectric layer of the multilayer ceramic capacitor of the related art.

If the difference between the average particle sizes D1 and D2 of the dielectric grains included in the first dielectric layer 111a and the second dielectric layer 111b and the average particle size D3 of the dielectric grains included in the third dielectric layer 111c is lower than 50 nm, the offset effect of the electrostriction may not be sufficient so it may be difficult to prevent the occurrence of electrostriction cracks and it may be difficult to distinguish among the first to third dielectric layers 111a, 111b, and 111c.

According to an exemplary embodiment, the difference between D1 and D3 may be adjusted to be 50 nm or more and the difference between D2 and D3 may be adjusted to 50 nm or more, thereby securing a sufficient offset effect of the electrostriction effect and suppressing the occurrence of electrostriction cracks.

Meanwhile, an upper limit of the difference between D1 and D3 and the difference between D2 and D3 may be determined in consideration of the thickness of the dielectric layer 111.

As described above, the third dielectric layer 111c has a larger particle size of dielectric grains than the first dielectric layer and the second dielectric layer 111a and 111b, and thus may serve to improve the capacitance of the multilayer ceramic capacitor.

Therefore, when the first dielectric layer and the second dielectric layer 111a and 111b are disposed on upper and lower surfaces of the third dielectric layer 111c, it may be easy to secure reliability, but if the thickness t3 of the third dielectric layer 111c is not sufficient for the thickness td of the dielectric layer, it may be difficult to secure high capacitance of the multilayer ceramic capacitor.

According to an exemplary embodiment, when the thickness of the dielectric layer is td, the ratio of t1 to td (t1/td) may be adjusted to ¼ or less and the ratio of t2 to td (t2/td) may be adjusted ¼ or less, and thus, high capacitance of the multilayer ceramic capacitor may be secured and the reliability thereof may be improved even if the first dielectric layer and the second dielectric layer 111a and 111b are disposed on the upper surface or the lower surface of the third dielectric layer 111c.

Hereinafter, a multilayer ceramic capacitor according to another exemplary embodiment in the present disclosure will be described in detail, but the same descriptions as those of the multilayer ceramic capacitor according to the exemplary embodiment will be omitted.

The multilayer ceramic capacitor according to another exemplary embodiment in the present disclosure includes a body including a dielectric layer and internal electrodes alternately disposed with the dielectric layer interposed therebetween and an external electrode disposed on the body and connected to the internal electrode. The dielectric layer includes a fourth dielectric layer and a fifth dielectric layer including dielectric grains having an average particle size greater than an average particle size of dielectric grains included in the fourth dielectric layer. t4<t5 in which t4 is an average thickness of the fourth dielectric layer and t5 is an average thickness of the fifth dielectric layer.

Figure 6:
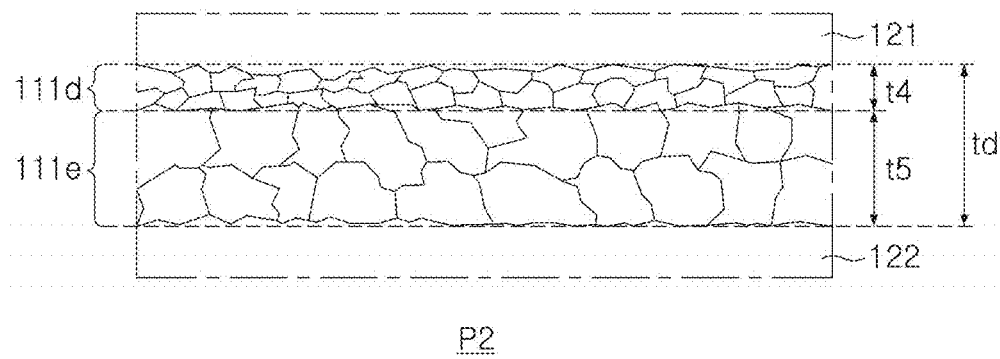
FIG. 6 is an enlarged view of region P2 of FIG. 2 according to another exemplary embodiment in the present disclosure.

Referring to FIG. 6, the dielectric layer 111 may include a fourth dielectric layer 111d and a fifth dielectric layer 111e including dielectric grains having different average particle sizes.

That is, an average particle size D5 of the dielectric grains included in the fifth dielectric layer 111e may be larger than an average particle size D4 of the dielectric grains included in the fourth dielectric layer 111d.

Here, that D5 is greater than D4 may mean that there is a sufficient difference for the offset effect of the electrostriction phenomenon described above to take place, and preferably there is a difference of 50 nm or more, or the ratio (D5/D4) of the average particle size D5 of the dielectric grains included in the fifth dielectric layer 111e to the average diameter D4 of the dielectric grains included in the fourth dielectric layer 111d may be 1.3 or greater.

In FIG. 6, the fourth dielectric layer 111d is formed at an upper portion of the dielectric layer 111 and the fifth dielectric layer 111e is formed at a lower portion of the dielectric layer 111, but the present disclosure is not limited thereto, and positions of the fourth dielectric layer 111d may be interchanged.

Accordingly, the dielectric layer 111 may include the fourth dielectric layer 111d adjacent to one end surface of the internal electrodes 121 and 122 in a stacking direction and the fifth dielectric layer 111e adjacent to the other end surface of the internal electrodes in the stacking direction, but the present disclosure is not limited thereto and the dielectric layer 111 may include the fourth dielectric layer 111d and the fifth dielectric layer 111e including dielectric grains having an average particle size greater than an average particle size of dielectric grains included in the fourth dielectric layer 111d.

Also, the average particle size D4 of the dielectric grains included in the fourth dielectric layer 111d may be smaller than the average particle size D5 of the dielectric grains included in the fifth dielectric layer 111e.

Here, D4 and D5 may differ by 50 nm or more, and due to this difference, the dielectric layer may be sufficiently distinguished when observed with a scanning electron microscope (SEM) or a transmission electron microscope (TEM).

Meanwhile, an upper limit of the difference between D4 and D5 may be determined in consideration of the thickness of the dielectric layer 111.

The fourth dielectric layer 111d may serve to improve high-temperature reliability because the average particle size D4 of the dielectric grains is smaller than the average particle size D5 of the dielectric grains of the fifth dielectric layer 111e.

The fifth dielectric layer 111e may serve to secure capacitance because the average particle size D5 of the dielectric grains is smaller than the average particle size D4 of the dielectric grains of the fourth dielectric layer 111d.

Since the fourth dielectric layer 111d contributes to the improvement of reliability, even if a thickness thereof is ⅓ to 1/10 of that of the fifth dielectric layer 111e, an effect of increasing reliability may be obtained, whereas the fifth dielectric layer 111e needs to account for a sufficient portion in the entire dielectric layer 111 to secure sufficient capacitance.

In the multilayer ceramic capacitor according to the present exemplary embodiment in the present disclosure, since thickness t5 of the fifth dielectric layer 111e including dielectric grains having a relatively large average particle size is greater than the average thickness t4 of the fourth dielectric layer 111d including dielectric grains having a relatively small average particle size, the reliability of the multilayer ceramic capacitor may be secured and sufficient capacitance may also be secured.

According to an exemplary embodiment, a ratio (t4/t5) of the average thickness t4 of the fourth dielectric layer 111d to the average thickness t5 of the fifth dielectric layer 111e may be 1/10 to 1/3.

Therefore, as described above, sufficient capacitance may be secured and high-temperature reliability may be improved.

As described above, if D5/D4 is less than 1.3, the difference in particle size of the dielectric grains of each region may be too small to induce the effect of canceling out the electrostriction phenomenon.

In addition, if D5/D4 exceeds 2.3, the difference in particle size of dielectric grains of each region may increase, which may lead to deterioration of high-temperature reliability.

According to an exemplary embodiment, since the ratio (D5/D4) of the average particle size D5 of the dielectric grains included in the fifth dielectric layer to the average particle size D4 of the dielectric grains included in the fourth dielectric layer is 1.3 to 2.3, it is possible to secure a sufficient difference between D4 and D5 to induce the offset effect of the electrostriction phenomenon, and at the same time prevent deterioration of high-temperature reliability.

According to an exemplary embodiment, an average thickness of the dielectric layer 111 may be 0.41 μm or less.

If the average thickness of the dielectric layer is as thin as 0.41 μm or less, more cracks may occur due to vibration due to electrostriction and it may be difficult to secure a high capacitance.

However, even when the average thickness of the dielectric layer 111 is 0.41 μm or less, D4<D5 and t4<t5 are satisfied, thereby canceling out the electrostriction phenomenon to suppress the occurrence of electrostriction cracks and secure sufficient capacitance.

Here, the average thickness of the dielectric layer 111 of 0.41 μm or less does not necessarily mean that the average thickness of the dielectric layer 111 should be 0.41 μm or less but may mean that the dielectric layer is thinner than the dielectric layer of the multilayer ceramic capacitor of the related art.

Method of Manufacturing a Multilayer Ceramic Capacitor

Hereinafter, a method of manufacturing a multilayer ceramic capacitor according to an exemplary embodiment in the present disclosure will be described, and the manufacturing method to be described below may be similarly applied to a case of manufacturing a multilayer ceramic capacitor according to another exemplary embodiment in the present disclosure.

First, a plurality of ceramic green sheets are prepared.

The ceramic green sheet is for forming the dielectric layer 111 of the body 110. A slurry may be prepared by mixing ceramic powder particles, a polymer, and a solvent, and the slurry may be subjected to a method such as a doctor blade method so as to be manufactured as a sheet having a predetermined thickness, for example, a thickness of 0.41 μm or less.

Usually, a dielectric layer between electrodes is formed of one ceramic sheet, but in order to secure a sufficient thickness, several of the same ceramic sheets may be stacked.

Meanwhile, according to an exemplary embodiment in the present disclosure, the dielectric layer between the internal electrodes may be formed of two or more different ceramic green sheets.

Here, the different ceramic green sheets may refer to a composition or a size of a powder particle used as a material.

According to an exemplary embodiment in the present disclosure, a first ceramic green sheet is formed by adding a fine base material and Mg, Dy or Tb capable of suppressing grain growth to an upper surface of a PET film.

Thereafter, a second ceramic green sheet is formed on the upper surface of the first ceramic green sheet using an assembly base material.

Next, a third ceramic green sheet having the same composition as that of the first ceramic green sheet is formed on an upper surface of the second ceramic green sheet.

In this case, the base material included in the ceramic green sheet may be a barium titanate ($BaTiO_3$)-based compound, and preferably, Ba/Ti may be 0.9950 to 1.0050, but is not limited thereto.

Accordingly, after sintering, a region corresponding to the first ceramic green sheet may be a first dielectric layer of a dielectric layer, a region corresponding to a second ceramic green sheet may be a third dielectric layer of the dielectric layer, and a region corresponding to a third ceramic green sheet may be a second dielectric layer of the dielectric layer, as described above with reference to FIG. 5.

In one example, forming one of the first ceramic green sheet and the third ceramic green sheet may be omitted. As such, after sintering, a region corresponding to the other of the first ceramic green sheet and the third ceramic green sheet may be a fourth dielectric layer of a dielectric layer and a region corresponding to a second ceramic green sheet may be a fifth dielectric layer of the dielectric layer, as described above with reference to FIG. 6.

A position at which each region of the dielectric layer is formed, a thickness of each region, and a particle size of dielectric grains may be adjusted using the method described above, but the present disclosure is not limited thereto.

Thereafter, an internal electrode is formed by printing a conductive paste for internal electrodes with a predetermined thickness, for example, 0.41 μm or less, on at least one surface of each of the ceramic green sheets.

The conductive paste for internal electrodes may include 94.0 to 99.6 wt % of nickel (Ni) and 0.4 to 6.0 wt % of copper (Cu). For example, the conductive paste for internal electrodes may be formed by mixing Ni powder and Cu powder or including Ni—Cu alloy powder. In this case, the conductive paste for internal electrodes may include a Ni—Cu alloy powder and may not include a ceramic material.

As a method of printing the conductive paste for internal electrodes, a screen-printing method or a gravure printing method may be used.

Referring to FIG. 4, a ceramic green sheet on which the first internal electrode 121 is printed and a ceramic green sheet on which the second internal electrode 122 are printed may be alternately stacked and then pressed in the stacking direction so that the plurality of stacked ceramic green sheets and the internal electrodes formed on the ceramic green sheet may be compressed together to form a stack.

In addition, the cover portions 112 and 113 may be formed by stacking at least one ceramic green sheet on upper and lower surfaces of the stack.

The cover portions 112 and 113 may have the same composition as that of the dielectric layer 111 located inside the stack, and differ from the dielectric layer 111 in that they do not include internal electrodes.

Thereafter, the stack is cut for each region corresponding to one capacitor to form a chip, and then sintered at a high temperature to complete the body 110.

Thereafter, a first internal electrode 131 and a second external electrode 132 may be formed to cover exposed portions of the first internal electrode and the second internal electrode exposed on both side surfaces of the body 110 to be electrically connected to the first internal electrode and the second internal electrode.

In this case, surfaces of the first internal electrode and the second external electrodes 131 and 132 may be plated with nickel or tin, if necessary.

Exemplary Embodiment

Table 1 below shows measurement of changes in a high-temperature accelerated life, the frequency of occurrence of electrostriction cracks according to the ratio of the average particle size D5 of dielectric grains included in the fifth dielectric layer to the average particle size D4 of dielectric grains included in the fourth dielectric layer after preparing a sample chip in which a dielectric layer in an active region of a multilayer ceramic capacitor is divided into fourth and fifth dielectric layers each having a different average particle size of dielectric grains.

The average particle size of dielectric grains included in each region may be measured as follows.

The "average particle size" of the dielectric grains may refer to an average value calculated using an image analysis program (Leica Microsystem's LAS X Grain Expert) after imaging ten points at equal intervals in the thickness direction in a cross-section passing through the center of a multilayer ceramic electronic component in the length direction and thickness direction.

In the high-temperature accelerated life test, the number of failures was checked by evaluating the high-temperature accelerated life under the conditions of 150° C., 2.0V, and 24 hours for 400 samples per each test number. In the case of failure, a case in which insulation resistance was $10^4 \Omega$ or less in the evaluation of the high-temperature accelerated life was determined as a failure.

The frequency of occurrence of electrostriction cracks may be checked by the amount of displacement according to voltage, and in order to evaluate electrostriction cracks, the sample chip was mounted on a substrate to which a voltage may be applied. When mounting on a substrate, a paste was applied to a plating portion of the substrate, mounted on a cover portion of the body, and then heat-treated and fixed on the substrate.

Electrostriction cracks may be checked by mounting a displacement sensor on the top of the body cover portion and applying voltage. By setting a step-up speed to 20V/sec when voltage is applied, a voltage at which cracks occur when applied from 0V to 350V may be checked, and electrostriction cracking voltages for the D5/D4 ratio may be compared.

TABLE 1

| Test No. | D5/D4 | High-temperature accelerated life (150° C. 2.0 VR 24 HR) | Frequency of occurrence of electrostriction crack |
| --- | --- | --- | --- |
| 1* | 2.7 | 400/400 | 0% |
| 2* | 2.5 | 28/400 | 0% |
| 3 | 2.3 | 0/400 | 0% |

TABLE 1-continued

| Test No. | D5/D4 | High-temperature accelerated life (150° C. 2.0 VR 24 HR) | Frequency of occurrence of electrostriction crack |
| --- | --- | --- | --- |
| 4 | 2.1 | 0/400 | 0% |
| 5 | 1.9 | 0/400 | 0% |
| 6 | 1.7 | 0/400 | 0% |
| 7 | 1.5 | 0/400 | 0% |
| 8 | 1.3 | 1/400 | 0% |
| 9* | 1.1 | 10/400 | 86% |
| 10* | 0.9 | 11/400 | 88% |
| 11* | 0.7 | 4/400 | 0% |
| 12* | 0.5 | 3/400 | 0% |

*Comparative example

In the case of Test Nos. 1 and 2 in which D5/D4 exceeds 2.3, it can be seen that the effect of improving the high-temperature accelerated life is insufficient or absent.

In the case of Test Nos. 9 and 10, in which D5/D4 is less than 1.3, it can be seen that the effect of canceling out the electrostriction phenomenon is absent or insufficient, and in the case of Test Nos. 11 and 12, it can be seen that the effect of improving the high-temperature accelerated life is insufficient.

Accordingly, D5/D4 preferably satisfies 1.3 to 2.3, and more preferably, D5/D4 satisfies 1.5 to 2.3.

One of the various effects of the present disclosure is to reduce a phenomenon of electrostrictive destruction caused by an electrostriction phenomenon when a dielectric layer is formed to be thin and address a problem of reduction of high-temperature reliability.

One of several effects of the present disclosure is to address a problem in which a dielectric constant is lowered when a particle size of a dielectric layer is reduced, in order to improve reliability of a multilayer ceramic capacitor.

However, various and beneficial advantages and effects of the present disclosure are not limited to the above, and will be more easily understood in the course of describing specific exemplary embodiments of the present disclosure.

While exemplary embodiments have been shown and described above, it will be apparent to those skilled in the art that modifications and variations could be made without departing from the scope of the present disclosure as defined by the appended claims.

What is claimed is:

1. A multilayer ceramic capacitor comprising:
a body including a dielectric layer and first and second internal electrodes alternately disposed with the dielectric layer interposed therebetween, a first external electrode disposed on the body and connected to the first internal electrode, and a second external electrode disposed on the body and connected to the second internal electrode,
wherein the dielectric layer includes a first dielectric layer adjacent to the first internal electrode, a second dielectric layer adjacent to the second internal electrode, and a third dielectric layer disposed between the first dielectric layer and the second dielectric layer,
D1<D3 and D2<D3, in which D1 is an average particle size of dielectric grains included in the first dielectric layer, D2 is an average particle size of dielectric grains included in the second dielectric layer, and D3 is an average particle size of dielectric grains included in the third dielectric layer, and
a ratio of D3 to D1 (D3/D1) satisfies 1.3 to 2.3, and a ratio of D3 to D2 (D3/D2) satisfies 1.3 to 2.3.

2. The multilayer ceramic capacitor of claim 1, wherein t1<t3 and t2<t3, in which t1 is an average thickness of the first dielectric layer, t2 is an average thickness of the second dielectric layer, and t3 is an average thickness of the third dielectric layer.

3. The multilayer ceramic capacitor of claim 2, wherein a ratio of t1 to t3 (t1/t3) satisfies 1/10 to 1/3, and a ratio of t2 to t3 (t2/t3) satisfies 1/10 to 1/3.

4. The multilayer ceramic capacitor of claim 2, wherein a ratio of t1 to td (t1/td) is 1/4 and a ratio of t2 to td (t2/td) is 1/4 or less, in which td is a thickness of the dielectric layer.

5. The multilayer ceramic capacitor of claim 1, wherein an average thickness of the dielectric layer is 0.41 μm or less.

6. The multilayer ceramic capacitor of claim 1, wherein a difference between D1 and D3 is 50 nm or more, and a difference between D2 and D3 is 50 nm or more.

7. The multilayer ceramic capacitor of claim 1, wherein the third dielectric layer is in contact with the first dielectric layer and the second dielectric layer.

8. The multilayer ceramic capacitor of claim 7, wherein the first dielectric layer is in contact with the first internal electrode, and the second dielectric layer is in contact with the second internal electrode.

9. A multilayer ceramic capacitor comprising:
a body including a dielectric layer and internal electrodes alternately disposed with the dielectric layer interposed therebetween and external electrodes disposed on the body and connected to the internal electrodes,
wherein the dielectric layer includes a fourth dielectric layer and a fifth dielectric layer including dielectric grains having an average particle size D5 greater than an average particle size D4 of dielectric grains included in the fourth dielectric layer,
t4<t5, in which t4 is an average thickness of the fourth dielectric layer and t5 is an average thickness of the fifth dielectric layer, and
a ratio of D5 to D4 (D5/D4) is 1.3 to 2.3.

10. The multilayer ceramic capacitor of claim 9, wherein a ratio of t4 to t5 (t4/t5) is 1/10 to 1/3.

11. The multilayer ceramic capacitor of claim 9, wherein an average thickness of the dielectric layer is 0.41 μm or less.

12. The multilayer ceramic capacitor of claim 9, wherein a difference between D4 and D5 is 50 nm or greater.

13. The multilayer ceramic capacitor of claim 9, wherein a ratio of t4 to td is 1/4 or less, in which td is an average thickness of the dielectric layer.

14. The multilayer ceramic capacitor of claim 9, wherein the fourth dielectric layer is disposed above the fifth dielectric layer.

15. The multilayer ceramic capacitor of claim 9, wherein the fourth dielectric layer is disposed below the fifth dielectric layer.

16. The multilayer ceramic capacitor of claim 9, wherein the fourth dielectric layer is in contact with the fifth dielectric layer.

17. The multilayer ceramic capacitor of claim 16, wherein the fourth dielectric layer is in contact with one of the internal electrodes, and the fifth dielectric layer is in contact with another of the internal electrodes.

18. A multilayer ceramic capacitor comprising:
a body including a dielectric layer and first and second internal electrodes alternately disposed with the dielectric layer interposed therebetween, a first external electrode disposed on the body and connected to the first internal electrode, and a second external electrode disposed on the body and connected to the second internal electrode,
wherein the dielectric layer includes a first dielectric layer adjacent to the first internal electrode, a second dielectric layer adjacent to the second internal electrode, and a third dielectric layer disposed between the first dielectric layer and the second dielectric layer,
D1<D3 and D2<D3, in which D1 is an average particle size of dielectric grains included in the first dielectric layer, D2 is an average particle size of dielectric grains included in the second dielectric layer, and D3 is an average particle size of dielectric grains included in the third dielectric layer, and
a difference between D1 and D3 is 50 nm or more, and a difference between D2 and D3 is 50 nm or more.

19. The multilayer ceramic capacitor of claim 18, wherein t1<t3 and t2<t3, in which t1 is an average thickness of the first dielectric layer, t2 is an average thickness of the second dielectric layer, and t3 is an average thickness of the third dielectric layer.

20. The multilayer ceramic capacitor of claim 19, wherein a ratio of t1 to t3 (t1/t3) satisfies 1/10 to 1/3, and a ratio of t2 to t3 (t2/t3) satisfies 1/10 to 1/3, or wherein a ratio of t1 to td (t1/td) is 1/4 and a ratio of t2 to td (t2/td) is 1/4 or less, in which td is a thickness of the dielectric layer.

\* \* \* \* \*